United States Patent
Yamada et al.

(10) Patent No.: US 6,805,985 B2
(45) Date of Patent: Oct. 19, 2004

(54) FUEL CELL AND FUEL CELL SYSTEM

(75) Inventors: Atsuo Yamada, Kanagawa (JP); Masafumi Ata, Kanagawa (JP)

(73) Assignee: Sony Corporation, Tokyo (JP)

( * ) Notice: Subject to any disclaimer, the term of this patent is extended or adjusted under 35 U.S.C. 154(b) by 363 days.

(21) Appl. No.: 10/003,455

(22) Filed: Oct. 31, 2001

(65) Prior Publication Data

US 2002/0106541 A1 Aug. 8, 2002

(30) Foreign Application Priority Data

Nov. 7, 2000 (JP) ..................................... P2000-338728

(51) Int. Cl.[7] ...................... H01M 14/00; H01M 16/00; H01M 8/18
(52) U.S. Cl. ........................ 429/21; 429/29; 429/218.2; 429/19
(58) Field of Search .............................. 429/21, 27, 29, 429/218.2, 33, 17, 19

(56) References Cited

U.S. PATENT DOCUMENTS

| | | | |
|---|---|---|---|
| 6,495,290 B1 * | 12/2002 | Hinokuma et al. | 429/231.8 |
| 2003/0013003 A1 * | 1/2003 | Hinokuma et al. | 429/40 |
| 2003/0116443 A1 * | 6/2003 | Maruyama et al. | 205/637 |

FOREIGN PATENT DOCUMENTS

EP 920065 A1 * 6/1999 ............ H01M/8/10

* cited by examiner

*Primary Examiner*—Patrick Ryan
*Assistant Examiner*—Tracy Dove
(74) *Attorney, Agent, or Firm*—Sonnenschein, Nath & Rosenthal LLP

(57) ABSTRACT

A fuel cell usable as a small-sized secondary cell such as a button type cell and a fuel cell system including the fuel cells are provided. The fuel cell has a first electrode, an electrolyte membrane, a second electrode, and a hydrogen storing material. The electrolyte membrane has polyfullerene hydroxide as a proton conductor. When a negative voltage is applied to the first electrode and a positive electrode is applied to the second electrode, protons, electrons, and oxygen are generated from water at the second electrode, and hydrogen is generated from the electrons and the protons at the first electrode. The hydrogen thus generated is stored in the hydrogen storing material, thus performing so-called charging. At the time of power generation, protons and electrons are generated, at the first electrode, from hydrogen supplied from the hydrogen storing material, and the generated protons are conducted to the second electrode via the electrolyte membrane and water is generated at the second electrode.

8 Claims, 10 Drawing Sheets

F I G. 3
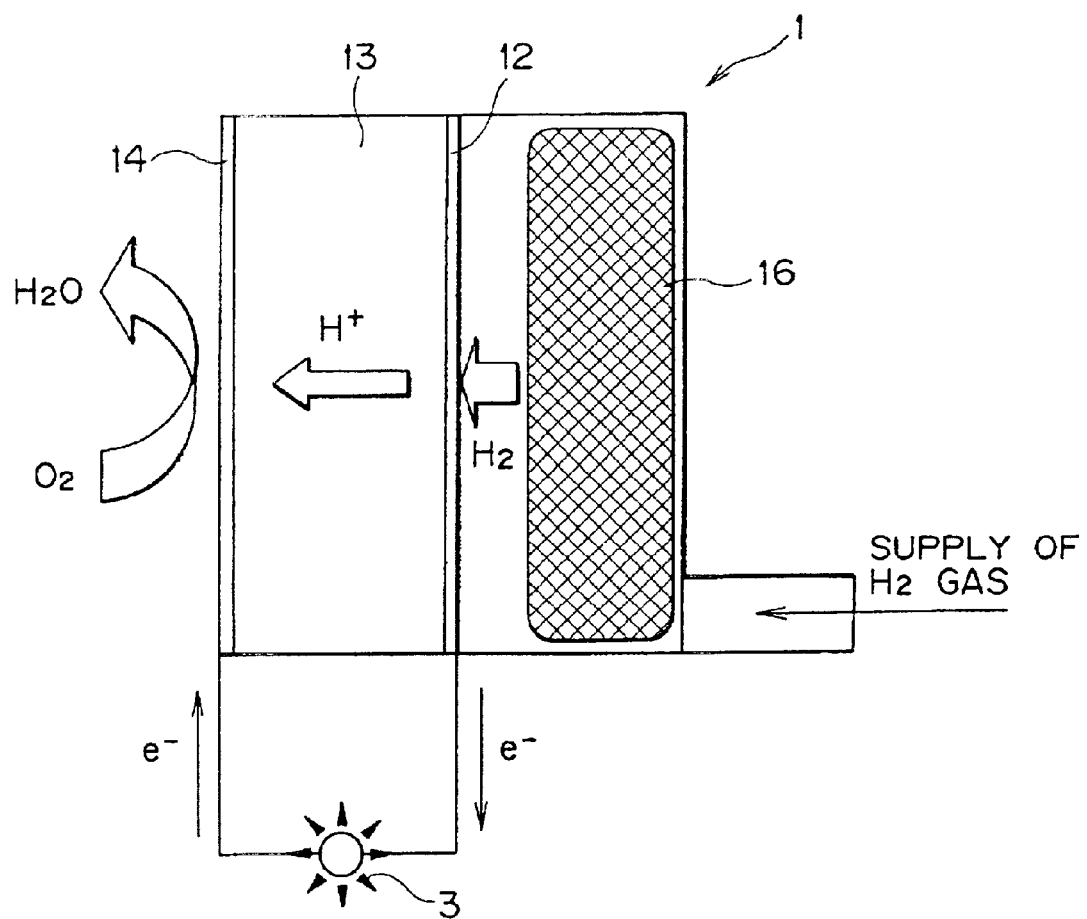

F I G. 13
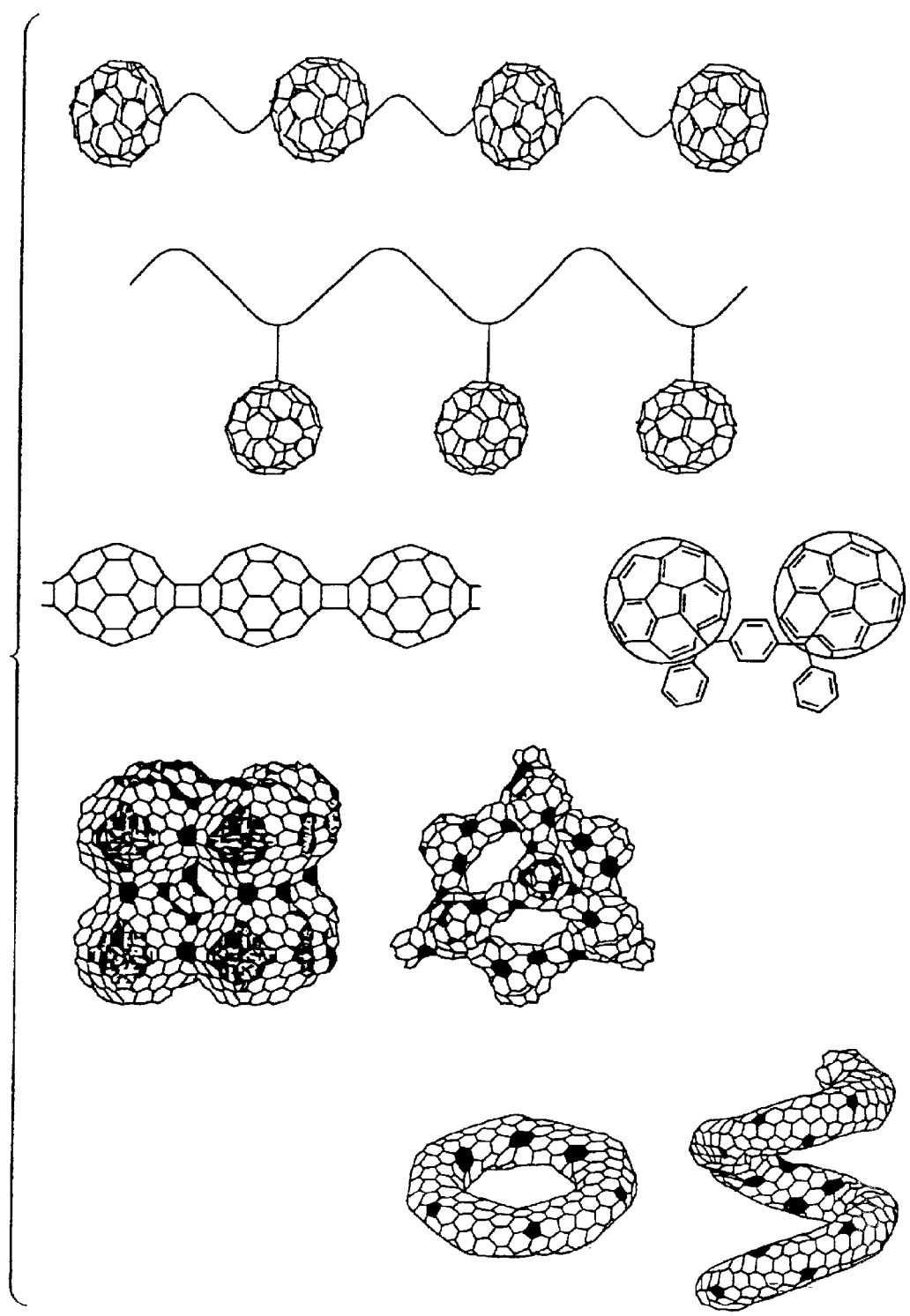

FUEL CELL AND FUEL CELL SYSTEM

RELATED APPLICATION DATA

The present application claims priority to Japanese Application(s) No(s). P2000-338728 filed Nov. 7, 2000, which application(s) is/are incorporated herein by reference to the extent permitted by law.

BACKGROUND OF THE INVENTION

The present invention relates to a fuel cell and a fuel cell system including the fuel cells, and particularly to a fuel cell having a function as a small-sized secondary cell and a fuel cell system including the fuel cells.

Fuel cells are known of a type in which a fuel electrode is connected to an oxygen electrode via an ion exchange membrane. In the fuel cell of this type, the ion exchange membrane has a proton conductor for conducting hydrogen ions, that is, protons generated at the fuel electrode to the oxygen electrode. As the proton conductor, there is used a solid polymer composed of a proton conductive organic material such as perfluorosulfonic acid resin (for example, sold by Du Pont Kabushiki Kaisha under the trade name of Nafion). The solid polymer composed of an organic material can conduct protons under a wet condition.

In a related art fuel cell, a fuel such as hydrogen gas is supplied from a fuel supply apparatus, which is provided outside the fuel cell, to a fuel electrode in order to generate hydrogen ions, that is, protons in the fuel electrode. On the other hand, moisture is supplied from a humidifier to an ion exchange membrane for bringing the ion exchange membrane into a proton conductive state.

The above-described related art fuel cell, however, has a disadvantage that since electric power is generated by supplying a fuel such as hydrogen gas from the fuel supply apparatus to the fuel electrode, it is difficult to use the fuel cell as a small-sized chargeable secondary cell applied to portable electronic devices or the like.

To be used as a secondary cell, a fuel cell may be configured by applying a negative voltage and a positive voltage to a fuel electrode and an oxygen electrode, respectively, bringing the oxygen electrode into contact with water, to generate protons, electrons, and oxygen at the oxygen electrode and generate hydrogen from the protons and the electrons at the fuel electrode, storing the hydrogen thus generated, and generating power by using the hydrogen thus stored. Such a fuel cell, however, has the following problem: namely, even if hydrogen can be stored, it is required yet to provide a humidifier for bringing an ion exchange membrane into a wet state, with a result that it is impossible to use the fuel cell as a small-sized secondary cell such as a button type cell.

SUMMARY OF THE INVENTION

An object of the present invention is to provide a fuel cell usable as a small-sized secondary cell such as a button type cell, and a fuel cell system including the fuel cells.

To achieve the above object, according to a first aspect of the present invention, there is provided a fuel cell including: a first electrode having a catalyst for generating hydrogen; a second electrode having a catalyst for generating oxygen, the second electrode being provided while allowed to be in contact with water; and a proton conductive electrolyte membrane having a proton conductor produced by introducing proton dissociative groups into a base body composed of a carbonaceous material containing carbon as a main component, the electrolyte membrane being provided between the first electrode and second electrode; wherein when a negative voltage is applied to the first electrode and a positive voltage is applied to the second electrode, oxygen, protons and electrons are generated from water under the presence of the catalyst at the second electrode, and hydrogen is generated from the protons and the electrons under the presence of the catalyst at the first electrode. Here, the wording "dissociation of protons" means a phenomenon that protons ($H^+$) are dissociated by ionization, and the wording "proton dissociative group" means a function group from which hydrogen ions (protons, $H^+$) are dissociated by ionization.

With this configuration, it is possible to generate hydrogen under the presence of water.

The fuel cell, preferably, further includes a storing material for capturing and storing the hydrogen generated at the first electrode.

With this configuration, since the fuel cell has the storing material, it can store hydrogen generated under the presence of water in the storing material, and thereby perform so-called charging.

In the fuel cell, preferably, the first electrode functions, in a state that no voltage is applied to the first electrode, as a fuel electrode which comes in contact with the hydrogen stored in the storing material, to generate protons and electrons from the hydrogen under the presence of the catalyst at the first electrode; the electrolyte membrane functions, in a state that no voltage is not applied to each of the first electrode and second electrode, as an ion exchange membrane which conducts the protons generated at the first electrode to the second electrode; and the second electrode functions, in a state that no voltage is applied to the second electrode, as an oxygen electrode which comes in contact oxygen, to generate water from the oxygen, the electrons, and the protons under the presence of the catalyst at the second electrode; whereby the fuel cell releases electric power as a whole, to thus perform power generation.

With this configuration, when it is not required to generate power, so-called charging can be performed by generating hydrogen under the presence of water, and when it is required to generate power, power generation can be performed by using the generated hydrogen, with a result that the fuel cell can be used like an ordinary secondary cell.

The storing material is preferably made from fullerene molecules, carbon nanotubes, or carbon nanofibers.

With this configuration, so-called charging can be easily and highly densely performed.

The storing material is preferably made from a hydrogen storing alloy.

With this configuration, so-called charging can be easily and highly densely performed.

In the fuel cell, preferably, a separation membrane for preventing the storing material from being corroded is provided between the storing material and the first electrode.

With this configuration, even if the first electrode is made from a material which may corrode the storing material, the storing material can be prevented from being corroded by the separation membrane.

The separation membrane is preferably a hydrogen selectively permeable membrane.

With this configuration, the separation membrane allows selective permeation of only hydrogen.

The separation membrane is preferably made from polyethylene, polypropylene, or polytetrafluoroethylene With this configuration, the permeation ability of hydrogen in the separation membrane can be enhanced.

Preferably, the storing material is in the form of fine particles which are aggregated into a storing body, and the storing body is disposed in proximity to the first electrode or directly connected to the first electrode.

With this configuration, since the storing material is in the form of fine particles, a total contact area of the storing material with hydrogen, which is capable of capturing and storing the generated hydrogen, can be enlarged, and since the storing body is disposed in proximity to the first electrode or directly connected to the first electrode, the fuel cell can be miniaturized to the level of a small-sized secondary cell such as a button type cell.

In the fuel cell, preferably, a separation membrane for preventing the fine particles of the storing material from being scattered to the first electrode is provided between the storing material and the first electrode.

With this configuration, it is possible to prevent fine particles of the storing material from being scattered to the first electrode.

The separation membrane is preferably a hydrogen selectively permeable membrane.

With this configuration, the fuel cell allows selective permeation of only hydrogen.

The separation membrane is preferably made from polyethylene, polypropylene, or polytetrafluoroethylene.

With this configuration, the permeation ability of hydrogen in the separation membrane can be enhanced.

To achieve the above object, according to a second aspect of the present invention, there is provided a fuel cell system having a plurality of membrane-electrode assemblies. Each of the membrane-electrode assemblies includes: a first electrode having a catalyst for generating hydrogen; a second electrode having a catalyst for generating oxygen, the second electrode being provided while allowed to be in contact with water; and a proton conductive electrolyte membrane having a proton conductor produced by introducing proton dissociative groups into a base body comprising a carbonaceous material containing carbon as a main component, the electrolyte membrane being provided between the first electrode and second electrode; wherein when a negative voltage is applied to the first electrode and a positive voltage is applied to the second electrode, oxygen, protons and electrons are generated from water in the presence of the catalyst at the second electrode, and hydrogen is generated from the protons and the electrons in the presence of the catalyst at the first electrode; and wherein the first electrode functions, in a state that no voltage is applied to the first electrode, as a fuel electrode which comes in contact with the hydrogen, to generate protons and electrons from the hydrogen in the presence of the catalyst at the first electrode; the electrolyte membrane functions, in a state that no voltage is not applied to each of the first electrode and second electrode, as an ion exchange membrane which conducts the protons generated at the first electrode to the second electrode; and the second electrode functions, in a state that no voltage is applied to the second electrode, as an oxygen electrode which comes in contact oxygen, to generate water from the oxygen, the electrons, and the protons in the presence of the catalyst at the second electrode; whereby the membrane-electrode assembly acts as a fuel cell, to release electric power, thus performing power generation.

With this configuration, so-called charging by generating hydrogen under the presence of water and power generation by releasing electric power can be separately, independently performed by individual membrane-electrode assemblies.

Each of the membrane-electrode assemblies preferably has a storing material for capturing and storing the generated hydrogen and supplying the hydrogen to the fuel electrode.

With this configuration, when it is not required to generate power, so-called charging can be performed by generating hydrogen under the presence of water and thus generated hydrogen is stored in a storing material, and when it is required to generate power, power generation can be performed by using the generated hydrogen. Further, since a large amount of hydrogen can be simultaneously generated and a large amount of electric power can be simultaneously generated by using a plurality of the membrane-electrode assemblies, the fuel cell system becomes advantageous when it is required to generate a large amount of hydrogen for a short time for achieving charging for a short time or to generate a large amount of electric power at the time of power generation.

In the fuel cell system, preferably, at least one of the membrane-electrode assemblies acts as a gas supply source for generating hydrogen, and at least one of the rest of the membrane-electrode assemblies acts as a power generator communicated to the gas supply source.

With this configuration, since the hydrogen generated at one membrane-electrode assembly can be used for power generation at another membrane-electrode assembly, a specification of one membrane-electrode assembly can be determined as being optimum to hydrogen generation and a specification of another membrane-electrode assembly can be determined as being optimum to power generation, with a result that it is possible to efficiently perform hydrogen generation and power generation by making specifications of the membrane-electrode assemblies different from each other.

BRIEF DESCRIPTION OF THE DRAWINGS

FIG. 3 is a typical diagram showing only a state in which the fuel cell according to the first embodiment of the present invention is operated for power generation;

FIG. 13 is a diagram showing structures of various carbon clusters each having a structure in which a plurality of cluster structures are variously bonded to each other, which clusters are usable as proton conductors of the fuel cell according to the first embodiment and its modifications of the present invention.

DETAILED DESCRIPTION OF THE PREFERRED EMBODIMENTS

The present invention will be more fully described with reference to the accompanying drawings, in which embodiments of the present invention are shown.

A first embodiment in which the present invention is applied to a fuel cell will be described with reference to FIGS. 1 to 4.

Figure 1:
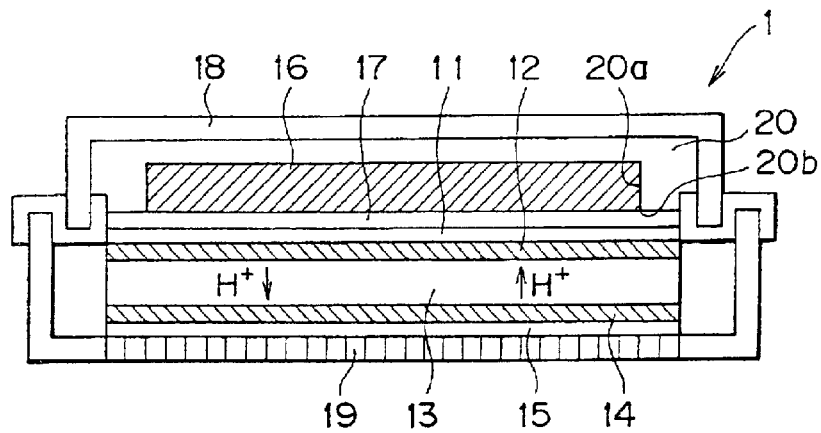
FIG. 1 is a sectional view showing a fuel cell according to a first embodiment of the present invention.

Referring to FIG. 1, there is shown a fuel cell 1 according to this embodiment, which includes a first current collector 11, a first electrode 12, an electrolyte membrane 13, a second electrode 14, and a second current collector 15, each of which is formed into a circular plate shape. As shown in the figure, these elements 15, 14, 13, 12 and 11 are stacked in this order with flat surfaces thereof being contact with to each other. Hydrogen ions, that is, protons is conducted between the first electrode 12 and the second electrode 14 via the electrolyte membrane 13. The first current collector 11 and the second current collector 15 are each made from a conductive metal coated with gold by plating. The first current collector 11 is electrically connected to the first electrode 12, and similarly, the second electrode 14 is electrically connected to the second current collector 15. The first electrode 12, the electrolyte membrane 13, and the second electrode 14 constitute a membrane-electrode assembly (hereinafter, referred to as "MEA").

The fuel cell 1 further includes a hydrogen storing material 16 and a separation membrane 17. The hydrogen storing material 16 is disposed on the side, connected to the first current collector 11, of the first electrode 12, and the first current collector 11 is indirectly connected to the hydrogen storing material 16 with a very thin separation membrane 17 put therebetween. Any element, for example, a humidifier, other than the separation membrane 17 is not provided between the first current collector 11 and the hydrogen storing material 16. Accordingly, the first electrode 12 is disposed in proximity to the hydrogen storing material 16.

The first current collector 11, the first electrode 12, the electrolyte membrane 13, the second electrode 14, the second current collector 15, the hydrogen storing material 16, and the separation membrane 17 are contained in a housing composed of an upper lid 18 and a lower lid 19, each of which is made from a conductive metal. The upper lid 18 is provided at a position at which the upper lid 18 is opposed to the hydrogen storing material 16, and the lower lid 19 is provided at a position at which the lower lid 19 is opposed to the second current collector 15. The upper lid 18 is electrically connected to the first current collector 11, and the lower lid 19 is electrically connected to the second current collector 15. The upper lid 18 is insulated from the lower lid 19. The lower lid 19 has a large number of holes for allowing permeation of oxygen in air therethrough. Each of the first current collector 11 and the second current collector 15 also has a number of holes, so that the first current collector 11 allows permeation of hydrogen molecules therethrough and the second current collector 15 allows permeation of oxygen in air therethrough. The outer shape of the fuel cell 1 is defined as a button type cell shape by the upper lid 18 and the lower lid 19.

The hydrogen storing material 16 is made from fine particles of a hydrogen storing alloy, which are contained in and supported by a recess 20a formed in a storing material support 20 provided on the back side of the upper lid 18. The fine particles of the hydrogen storing alloy contained in and supported by the recess 20a of the storing material support 20 are aggregated into a storing body. The hydrogen storing material 16 is configured so as to capture and store hydrogen, which has been generated in the first electrode 12, and to supply the stored hydrogen to the first electrode 12. Here, the wording "capture and store hydrogen" is not necessarily limited to a meaning "capture and store hydrogen in the state of hydrogen molecules", but contains a meaning "capture and store hydrogen from the first electrode 12 in a specific state depending on the kind of a material forming the hydrogen storing material 16". Further, the wording "supply hydrogen" is not necessarily limited to a meaning "supply hydrogen to the first electrode 12 in the state of hydrogen molecules" but contains a meaning "supply hydrogen captured and stored in the hydrogen storing material 16 in the specific state to the first electrode 12 in a specific state allowing the first electrode 12 to generate hydrogen ions, that is, protons".

The first electrode 12 is made from a porous carbon in which a platinum catalyst is supported. The porous carbon is impregnated with a proton conductor. The proton conductor is formed by introducing proton dissociative groups in a base body composed of a carbonaceous material containing carbon as a main component. In this embodiment, a fullerene derivative based proton conductor, for example, polyfullerene hydroxide is used. Since the first electrode 12 is made from the porous carbon, hydrogen can be permeated in the first electrode 12. Also, since the first electrode 12 is impregnated with a fullerene derivative based proton conductor functioning as an ion conductor, it is possible to desirably keep the ion conductivity in the first electrode 12 even in a fuel non-humidified state, and to make the fullerene derivative based proton conductor conformable to the platinum catalyst.

The fullerene derivative based proton conductor used herein contains, as a base body, fullerene molecules in the form of spherical cluster molecules, which are generally selected from $C_{36}$, $C_{60}$, $C_{70}$, $C_{76}$, $C_{78}$, $C_{80}$, $C_{82}$, $C_{84}$, and the like. In this embodiment, $C_{60}$ and $C_{70}$ are selected as the fullerene molecules. Proton dissociative groups are introduced to carbon atoms constituting each of the fullerene molecules thus selected, to form the fullerene derivative based proton conductor suitable for the present invention. In addition, to enhance the proton dissociation characteristic of the proton dissociative groups, electron attractive groups may be introduced thereto. The proton dissociative groups mean function groups from which hydrogen ions (protons, H⁺) are dissociated by ionization. Examples of kinds of the proton dissociative groups include —OH, —OSO$_3$H, —COOH, —SO$_3$H, and —OPO(OH)$_2$, and in this embodiment, —OH or —OSO$_3$H is preferably used. In particular, a membrane formed by polyfullerene hydroxide (often called fullerenol) having —OH groups as the proton dissociative groups is superior to a membrane formed by the related art material, for example, perfluorosulfonic acid resin in terms of film formation characteristic or the like, and the membrane does not require a humidifier or the like because the conduction of protons do not require the aid of water molecules. The membrane formed by fullerenol is further advantageous in that it can be operated in a wide operational temperature range of −40° C. to 160° C. For these reasons, the membrane formed by fullerenol is suitable for the electrochemical device (fuel cell) of the present invention. Examples of kinds of the electron attractive groups include a nitro group, a carbonyl group, a carboxyl group, a nitrile group, an alkyl halide group, and a halogen atom (for example, fluorine atom or chlorine atom). These groups and halogen atoms may be used singly or in combination.

The second electrode 14 is made from the same porous carbon as that used for the first electrode 12, in which the platinum catalyst is supported. The porous carbon is impregnated with the same fullerene derivative based proton conductor as that used for the first electrode 12. Since the second electrode 14 is made from the porous carbon, oxygen in air, which has entered the holes formed in the lower lid 19 and the second current collector 15, can be permeated in the second electrode 14.

The same fullerene derivative based proton conductor as that used for the first electrode 12 is used for the electrolyte membrane 13. To be more specific, the electrolyte membrane 13 is formed by filling a porous base body, which is made from polyethylene (PE), polypropylene (PP), or polytetrafluoroethylene (PTFE), with the fullerene derivative based proton conductor.

The separation membrane 17 is formed by a porous base body made from polyethylene (PE), polypropylene (PP), or polytetrafluoroethylene (PTFE) Since the fullerene derivative based proton conductor impregnated in the first electrode 12 is acidic, if the first electrode 12 comes in direct-contact with the hydrogen storing material 16, then the hydrogen storing alloy forming the hydrogen storing material 16 may be corroded. To prevent such corrosion of the hydrogen storing alloy, the separation membrane 17 is provided between the first electrode 12 and the hydrogen storing material 16 for preventing the direct contact between the hydrogen storing material 16 and the first electrode 12. Although the hydrogen storing material 16 is contained in and supported by the storing material support 20 because the hydrogen storing material 16 is formed by the fine particles of the hydrogen storing alloy as described above, an opening portion 20b of the recess 20a is surrounded not by the storing material support 20 but by the separation membrane 17 in order to supply hydrogen from the hydrogen storing material 16 to the first electrode 12. The separation membrane 17 is configured so as to prevent the hydrogen storing material 16 in the form of fine particles from being scattered from the opening portion 20b to the first current collector 11 and the first electrode 12. The interior of the separation membrane 17 is configured so as to allow permeation of hydrogen molecules.

Figure 2:
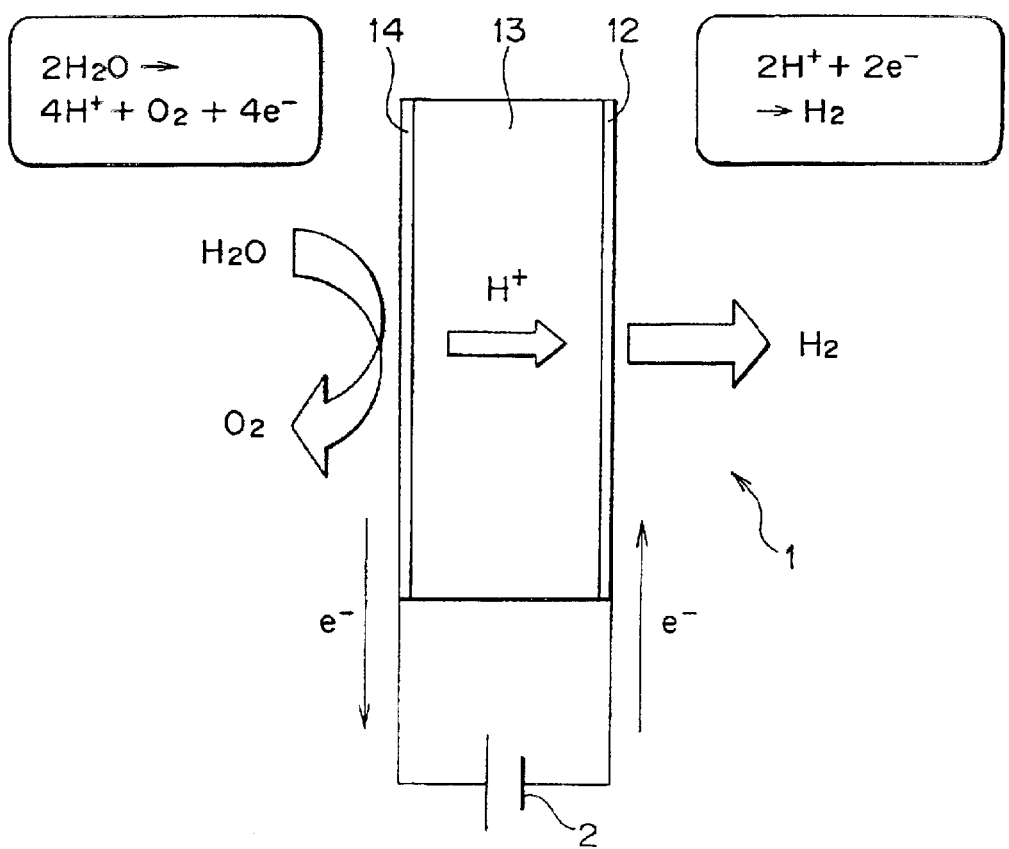
FIG. 2 is a typical diagram showing only a state in which the fuel cell according to the first embodiment of the present invention is operated for hydrogen generation.
Figure 4:
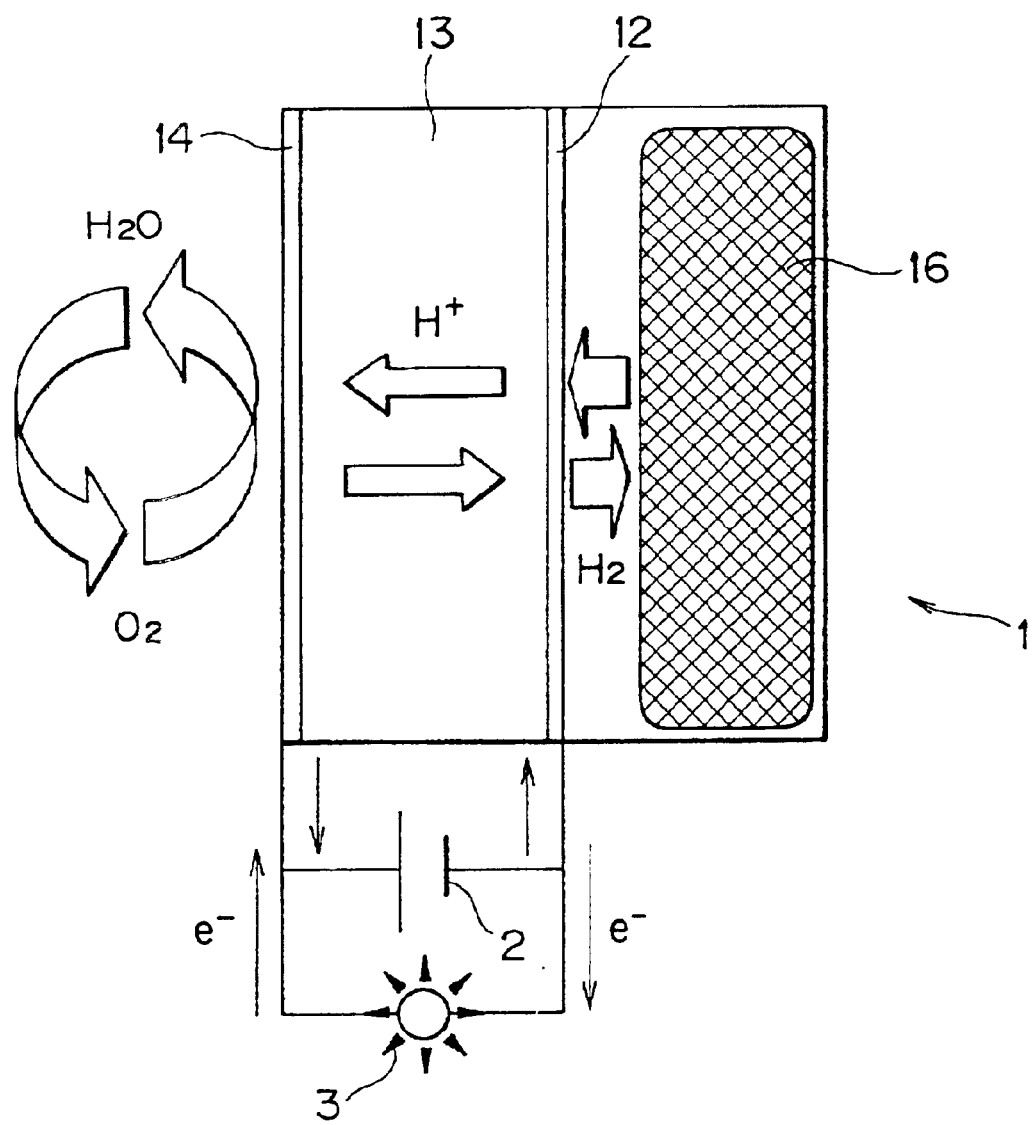
FIG. 4 is a typical diagram showing a state in which the fuel cell according to the first embodiment of the present invention is operated for both charging and power generation.

The operation of the fuel cell 1 will be described below. In the case of generating hydrogen by the fuel cell 1, as shown in FIG. 2 or 4, the fuel cell is connected to a power source 2 provided outside the fuel cell 1 in such a manner that a negative voltage is applied to the first electrode 12 and a positive voltage is applied to the second electrode 14. The second electrode 14 of the fuel cell 1 is in contact with moisture in air. The moisture is decomposed into oxygen, electrons, and protons under the presence of the platinum catalyst in the second electrode 14. The electrons migrate to the first electrodes 12 via the power source 2 connected to terminals of the fuel cell 1. The protons are conducted in the electrolyte membrane 13, to migrate to the first electrode 12. The oxygen is released from the second electrode 14 to atmospheric air. The protons and electrons, which have migrated from the second electrode 14 to the first electrode 12, react with each other under the presence of the platinum catalyst in the first electrode 12, to produce hydrogen. The hydrogen is, as shown in FIG. 4, captured and stored in the hydrogen storing material 16. It is to be noted that an electric lamp 3 schematically shown in FIG. 4 in a state being connected to the fuel cell 1 is kept in a non-connected state when the fuel cell 1 is used for generating hydrogen, and that the hydrogen storing material 16 is omitted in FIG. 2 for easy understanding of the operation of generating hydrogen.

In the case of using the fuel cell 1 for power generation, the first electrode 12 is taken as a fuel electrode, the electrolyte membrane 13 is taken as an ion exchange film, and the second electrode 14 is taken as an oxygen electrode. As shown in FIG. 3 or 4, an external circuit having an electric load is connected to terminals of the fuel cell 1. In the figure, the electric lamp 3 is schematically shown as the electric load.

Hydrogen stored in the hydrogen storing material 16 is supplied to the first electrode 12 of the fuel cell 1, and oxygen in air is in contact with the second electrode 14. The hydrogen thus supplied is decomposed into protons and electrons under the presence of the platinum catalyst in the first electrode. The electrons migrate to the second electrode 14 via the electric lamp 3 as the electric load connected between the first electrode 12 and the second electrode 14 of the fuel cell 1. The protons are conducted in the electrolyte membrane 13, to migrate to the second electrode 14. The oxygen being in contact with the second electrode 14 reacts with the protons and electrons having migrated from the first electrode 12 under the presence of the platinum catalyst in the second electrode 14. It is to be noted that the power source connected to the fuel cell 1 shown in FIG. 4 is kept in a non-connected state when the fuel cell 1 is used for power generation, and that a state in which an H$_2$ gas is supplied to the hydrogen storing material 16 is schematically shown in FIG. 3 for easy understanding of the operation of power generation; however, in actual, the supply source of the H$_2$ gas is the first electrode 12.

Figure 5:
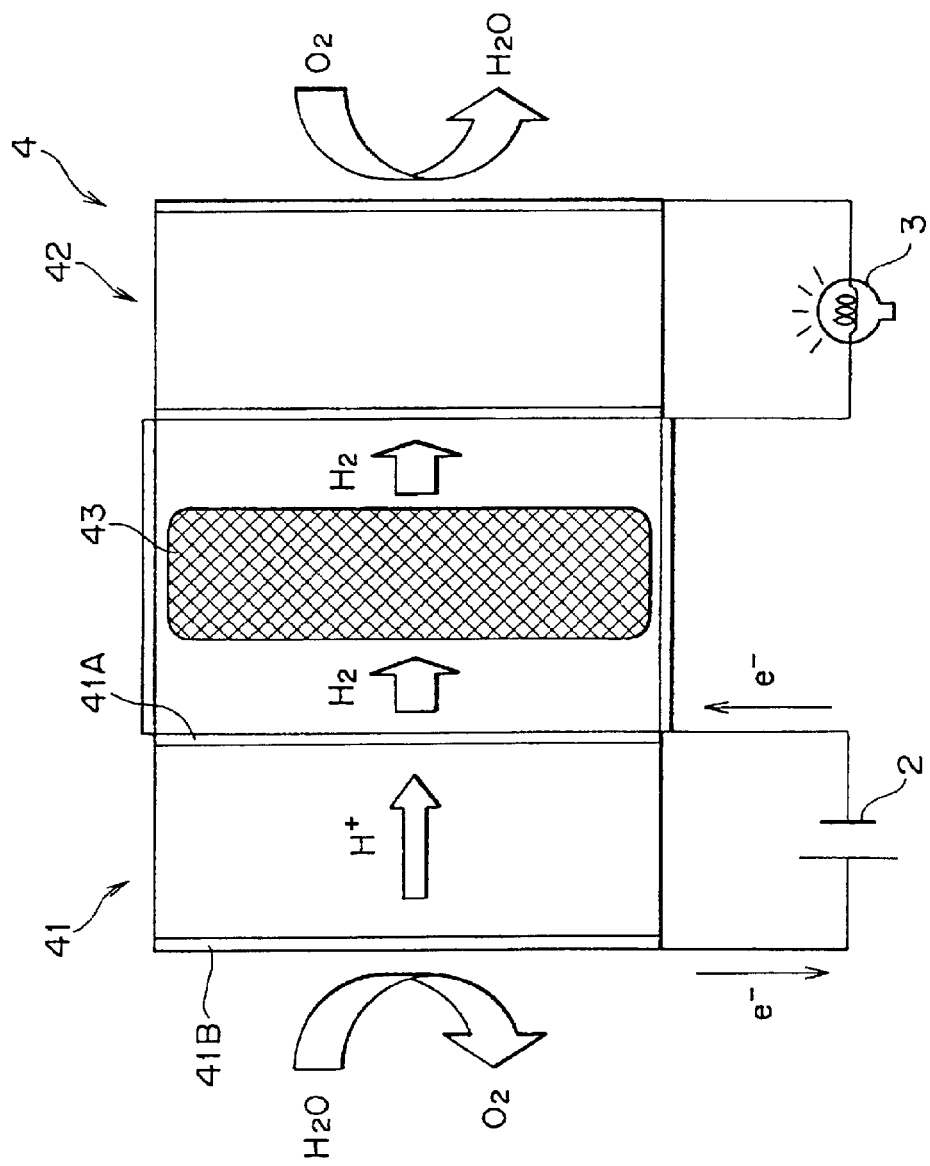
FIG. 5 is a typical diagram showing a state in which a fuel cell system according to a second embodiment of the present invention is operated for charging or power generation.

A second embodiment in which the present invention is applied to a fuel cell system will be described with reference to FIG. 5. Referring to FIG. 5, there is shown a fuel cell system 4 provided with two MEAs 41 and 42, each of which is the same as that provided in the fuel cell 1 according to the first embodiment. The one MEA 41 is configured so as to function as a gas supply source for generating hydrogen, and the other MEA 42 is configured so as to function as a power generator for generating power. Accordingly, the MEAs 41 and 42 are different from each other in terms of specifications such as dimension, the kind of catalyst, and mixing ratio between water repellent agents.

A hydrogen storing material 43 made from the same hydrogen storing alloy as that used for the hydrogen storing material 16 according to the first embodiment is provided between the MEAs 41 and 42 in order that one of the MEAs 41 and 42 can capture and store hydrogen generated by the other of the MEAs 41 and 42. In other words, the MEAs 41 and 42 are communicated to each other so as to allow migration of hydrogen via the hydrogen storing material 43.

In the case of charging the fuel cell system 4 by generating hydrogen, only the one MEA 41 is used. To be more specific, a power source 2 is connected to the one MEA 41 in such a manner that a negative voltage is applied to a first electrode 41A and a positive voltage is applied to a second electrode 41B. After the charging is ended, the power source 2 is removed from the one MEA 41. In the case of generating power by a fuel cell function of the fuel cell system 4, only the other MEA 42 is used by connecting an external circuit having an electric lamp 3 as an electric load which is connected to the other MEA 42. It is to be noted that although the power source 2 is connected to the one MEA 41 and the electric lamp 3 is connected to the other MEA 42 in FIG. 5, such connection is for illustrative purposes only, and as described above, it is required to connect the power source 2 to the one MEA 41 and disconnect the electric lamp 3 from the other MEA 42 at the time of generating hydrogen, and to connect the electric lamp 3 to the other MEA 42 and disconnect the power source 2 from the one MEA 41 at the time of generating power.

Since the one MEA 41 functioning as the gas supply source for generating hydrogen and the other MEA 42 functioning as the power generator for generating power, which are different from each other in terms of specifications, are separately provided, it is possible to enhance the functions of generating hydrogen and generating power.

The fuel cell and the method of producing the fuel cell according to the present invention are not limited to the above-described embodiments, and it is to be understood that various changes and modifications may be made without departing from the scope of the following claims. For example, the generation of hydrogen is performed by using moisture in air in the fuel cell 1 according to the first embodiment; however, water may be supplied to the second electrode 14 in place of moisture in air.

The hydrogen storing material 16 is disposed in proximity to the first electrode 12 in the fuel cell 1 according to the first embodiment; however, if there is no problem associated with corrosion of the hydrogen storing material 16, the hydrogen storing material 16 may be directly connected to the first electrode 12.

Although the hydrogen storing material 16 is made from the hydrogen storing alloy in the form of fine particles, it may be made from the hydrogen storing alloy in the form a bulk. Even in this case, by disposing the hydrogen storing material 16 in proximity to the first electrode 12 or directly connecting the hydrogen storing material 16 to the first electrode 12 like the first embodiment, it is possible to produce a fuel cell as a small-sized secondary cell having the same size as that of a button type cell.

The hydrogen storing material 16 is made from the hydrogen storing alloy in the fuel cell 1 according to the first embodiment; however, it may be made from fullerene molecules, nanotubes, or nanofibers.

If the hydrogen storing material 16 is made from a material not corroded by the proton conductor impregnated in the first electrode 12, the separation membrane 17 is not required to be provided. The material such as polyethylene used in the fuel cell 1 according to the first embodiment may be replaced with a hydrogen selective permeation membrane made from a palladium alloy or a Zr—Ni alloy.

The electrolyte membrane 13 is formed by impregnating the porous base body with the fullerene derivative based proton conductor in the fuel cell 1 according to the first embodiment; however the electrolyte membrane 13 may be replaced with a so-called self-humidifying type solid polymer membrane in which a trace of a catalyst composed of ultrafine particles of platinum and also ultrafine particles of an oxide such as $TiO_2$ or $SiO_2$ are densely dispersed, or a polymer membrane to which a proton conductive inorganic compound such as phosphoric acid-silicate ($P_2O_5$—$SiO_2$) based glass is added. Like the fuel cell 1 according to the first embodiment, the use of such a membrane can eliminate the need of giving moisture to a fuel by a humidifier or the like.

Figure 6:
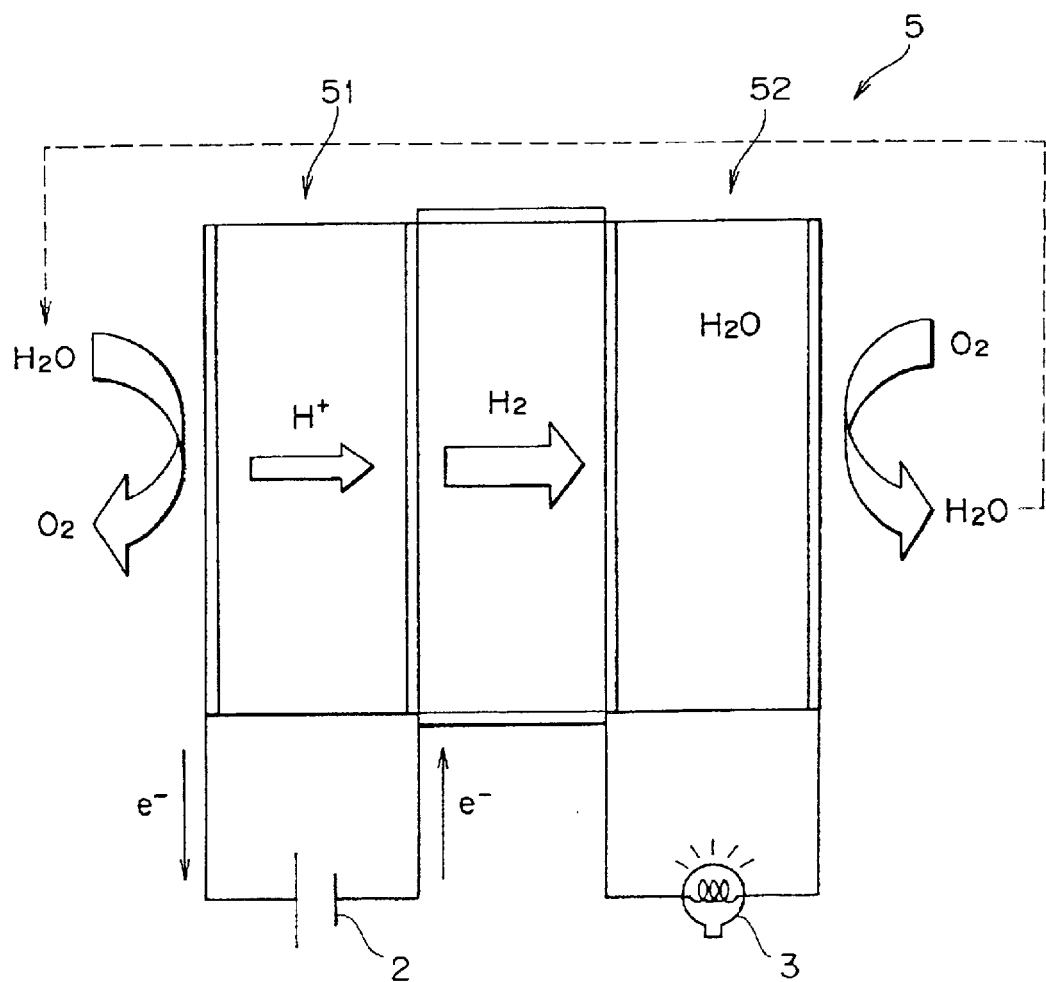
FIG. 6 is a typical diagram showing a fuel cell system according to a modification of the second embodiment of the present invention.

According to the second embodiment, the hydrogen storing material 43 is provided in the fuel cell system 4; however, the fuel cell system 4 may be modified into a fuel cell system 5, shown in FIG. 6, configured such that the hydrogen storing material 43 is not provided, and one MEA 51 is directly communicated to the other MEA 52 in order for the other MEA 52 to immediately generate power by using hydrogen generated by the one MEA 51. Additionally, in the fuel cell system 5 shown in FIG. 6, in order for the other MEA 52 to immediately generate power by using hydrogen generated by the one MEA 51, a power source 2 is fixedly connected to the one MEA 51 and an electric lamp 3 is fixedly connected to the other MEA 52. This configuration is different from that of the fuel cell system 4 shown in FIG. 5 in which the connection of the power source 2 and the electric lamp 3 is selectively performed.

In the fuel cell system 4 according to the second embodiment, the one MEA 41 is used for generating hydrogen and the other MEA 42 is used for generating power; however, both the MEAs 41 and 42 may be used for generating hydrogen or generating power, as needed.

Figure 7:
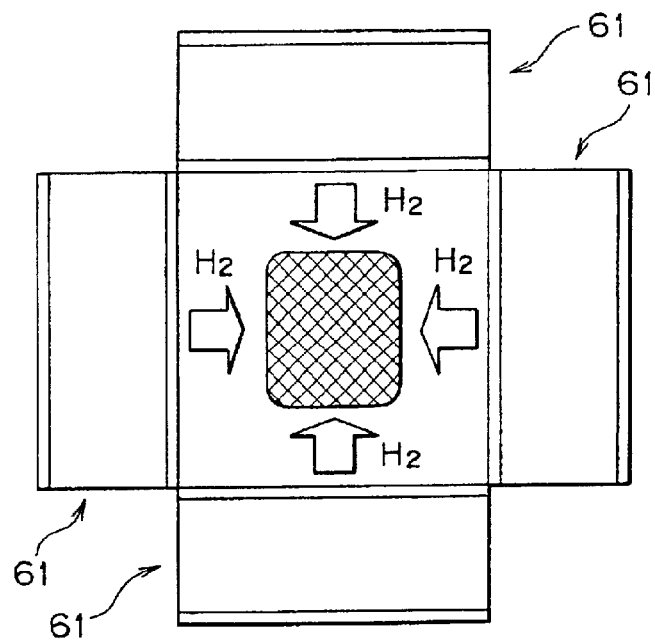
FIG. 7 is a typical diagram showing a state in which a fuel cell system according to another modification of the second embodiment of the present invention is operated for hydrogen generation.
Figure 8:
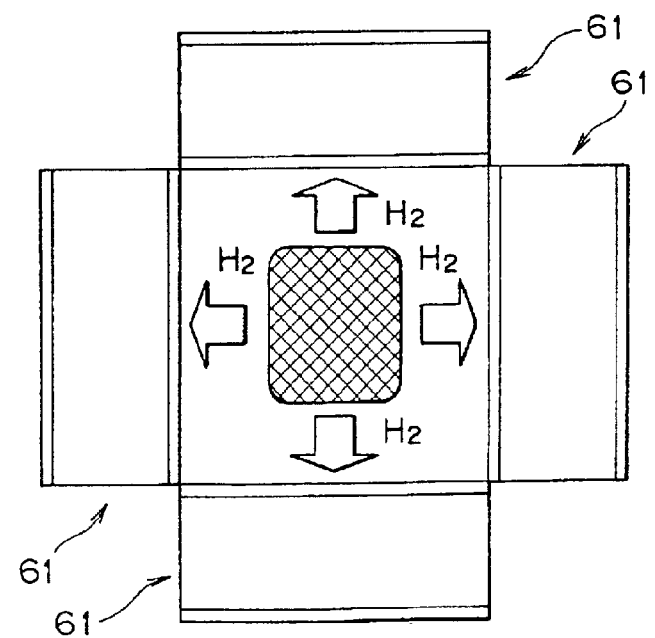
FIG. 8 is a typical diagram showing a state in which a fuel cell system according to a further modification of the second embodiment of the present invention is operated for power generation.

In the fuel cell system 4 according to the second embodiment, a plurality of the MEAs different from each other in terms of specifications are provided; however, the fuel cell system 4 may be modified into a fuel cell system, shown in FIGS. 7 and 8, configured such that a plurality of MEAs 61 having the same specifications are provided, wherein each of the MEAs performs both generation of hydrogen and generation of power. With this configuration, in the case of requiring a large amount of hydrogen or a large amount of power for a short time, it is possible to collectively generate hydrogen or power by simultaneously using the plurality of MEAs 61.

In the fuel cell system 4 according to the second embodiment, two pieces of the MEAs are provided, the number of the MEAs is not limited thereto.

Figure 9:
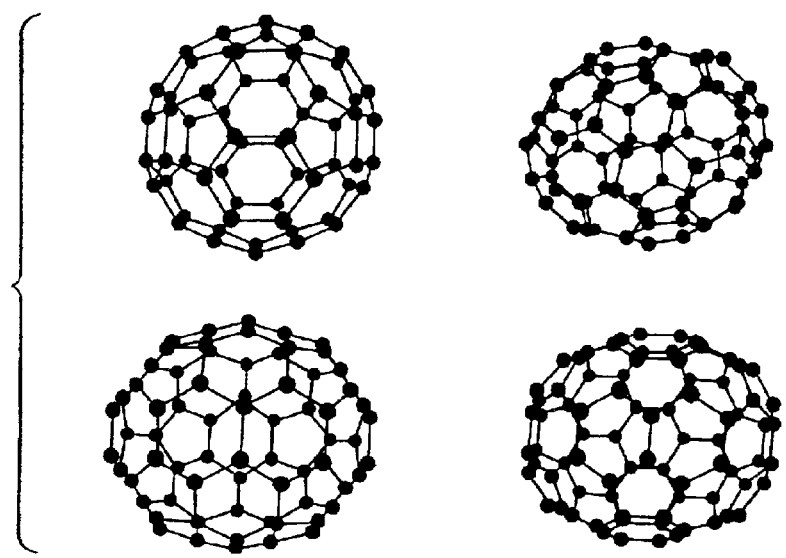
FIG. 9 is a diagram showing structures of various fullerene molecules used as proton conductors of the fuel cell according to the first embodiment of the present invention.
Figure 10:
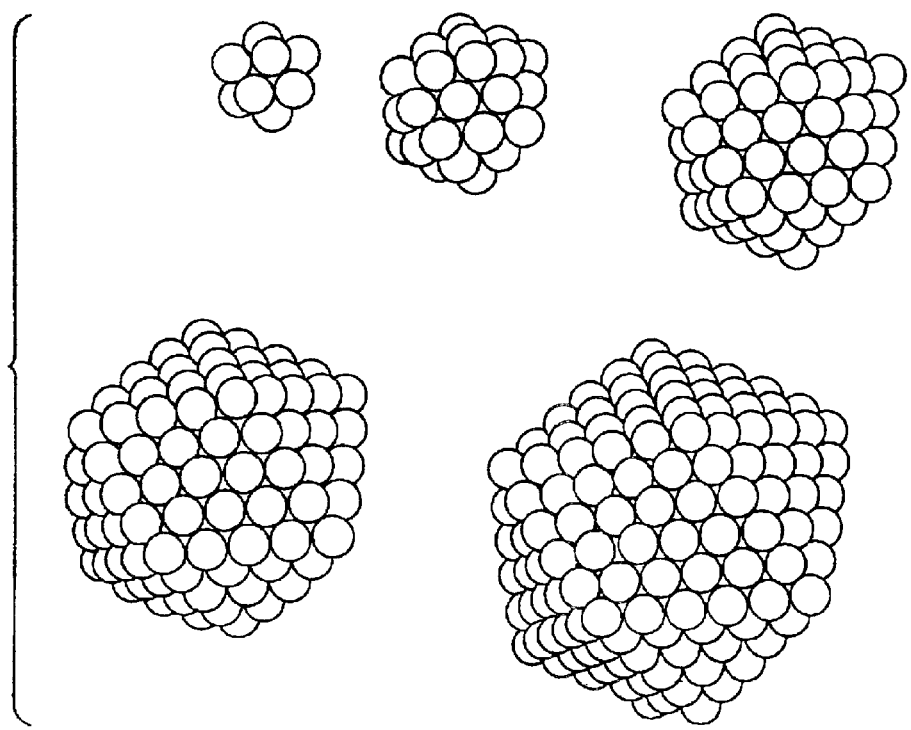
FIG. 10 is a diagram showing structures of various carbon clusters each having a spherical structure, a spheroid structure, or a closed face structure similar to the spherical or spheroid structure, which clusters are usable as proton conductors of the fuel cell according to the first embodiment and its modifications of the present invention.
Figure 11:
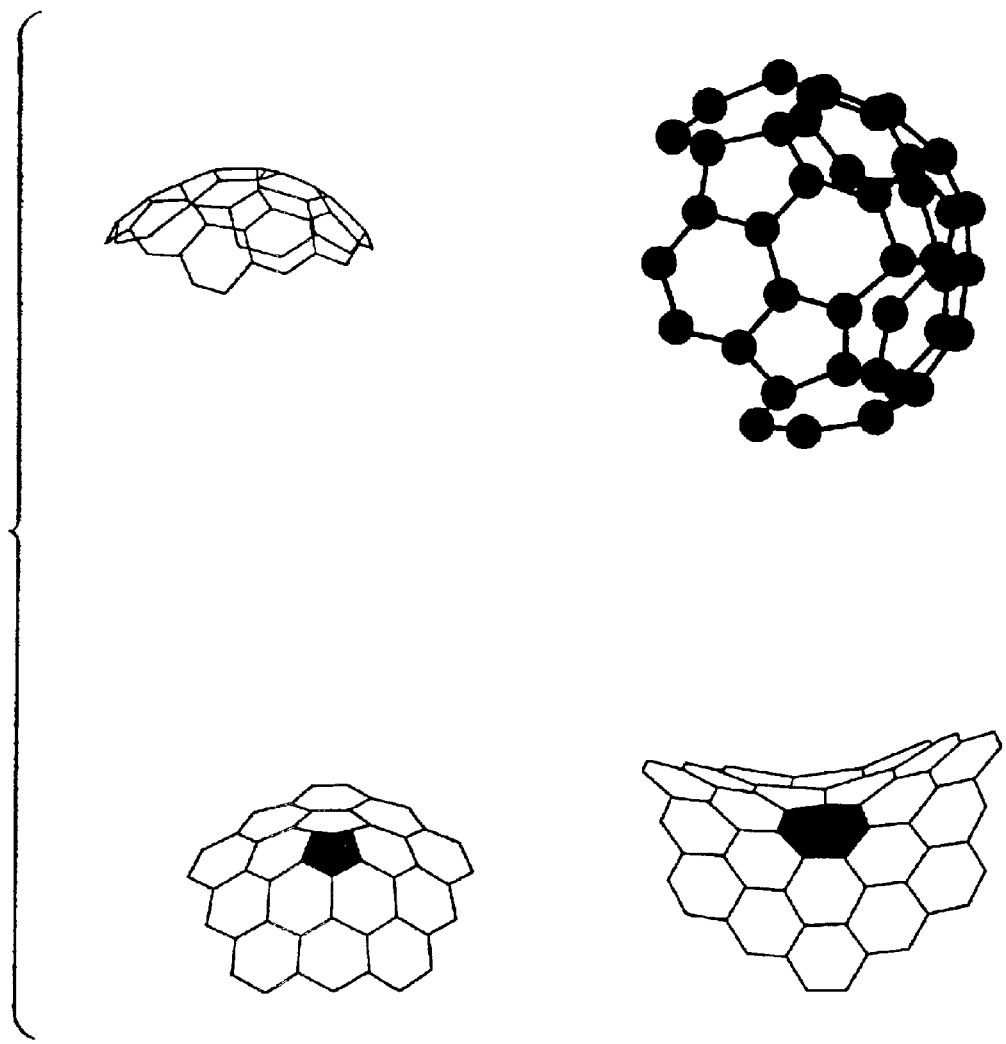
FIG. 11 is a diagram showing structures of various carbon clusters each having a spherical structure, part of which is lost and which has open ends, which clusters are usable as proton conductors of the fuel cell according to the first embodiment and its modifications of the present invention.
Figure 12:
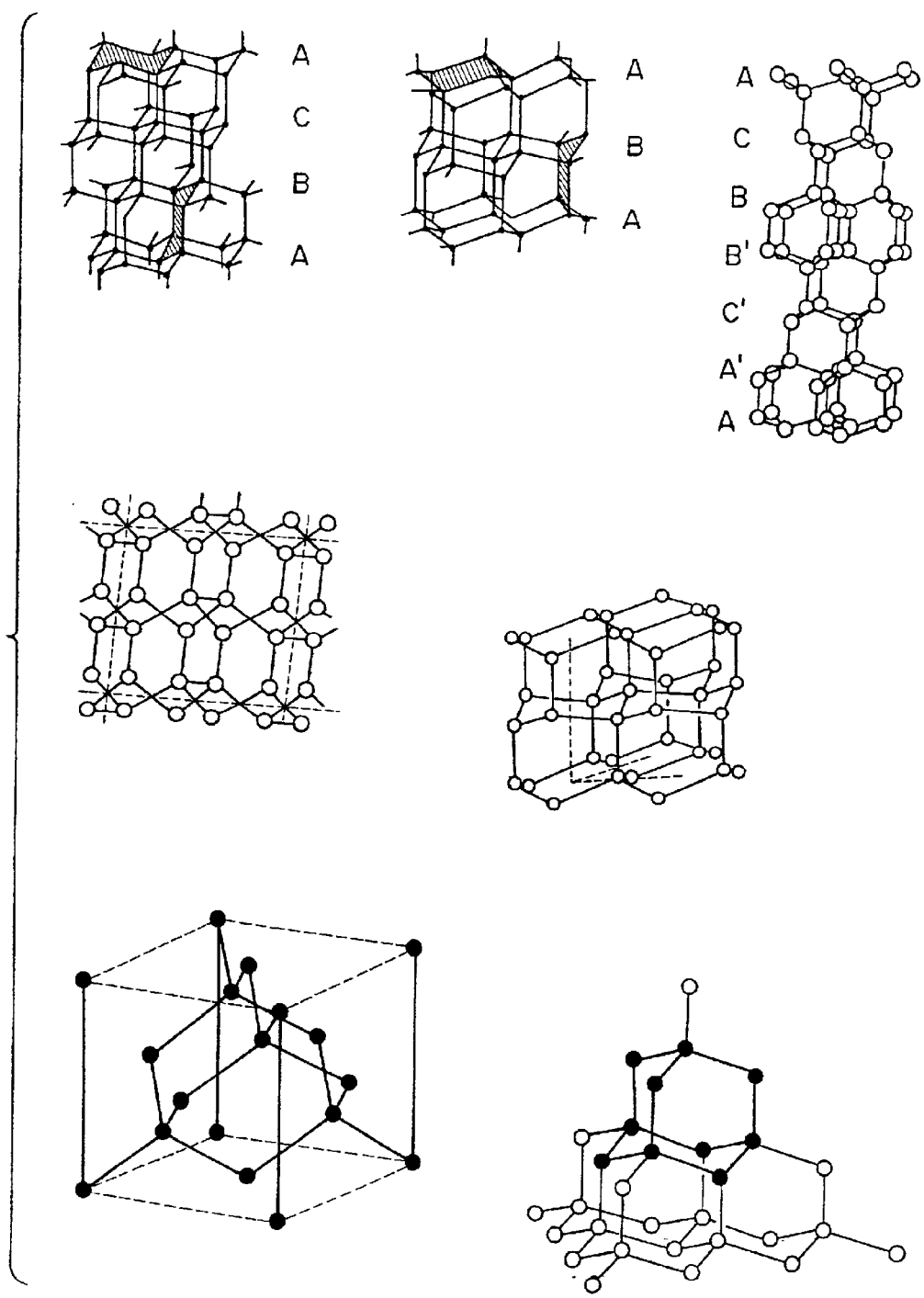
FIG. 12 is a diagram showing structures of various carbon clusters each having a diamond structure in which most of carbon atoms are bonded to each other in an $Sp^3$ bonding manner, which clusters are usable as proton conductors of the fuel cell according to the first embodiment and its modifications of the present invention.

In the fuel cell 1 according to the first embodiment, polyfullerene hydroxide (generally called fullerenol) is used as the proton conductor forming an ion exchange membrane allowing conduction of protons in a non-humidified state; however, the present invention is not limited thereto. Polyfullerene hydroxide contains fullerene molecules shown in FIG. 9 as a base body, wherein hydroxyl groups are introduced in carbon atoms of each of the fullerene molecules. The base body of the proton conductor, however, may be configured as a carbonaceous material containing carbon as a main component. Examples of the carbonaceous materials include a carbon cluster, that is, an aggregate in which carbon atoms of several to several hundreds are bonded to each other irrespective of the kind of carbon-carbon bonding, and carbonaceous tubes (generally called carbon nanotubes). Examples of the carbon clusters include a carbon cluster composed of an aggregate of a number of carbon atoms, which has a spherical structure, a spheroid structure, or a closed face structure similar to the spherical or spheroid structure (see FIG. 10), a carbon cluster having a spherical structure, part of which is lost and which has open ends (see FIG. 11), a carbon cluster having a diamond structure in which most of carbon atoms are bonded to each other in an $Sp^3$ bonding manner (see FIG. 12), and a carbon cluster having a structure in which the above clusters are variously bonded to each other (see FIG. 13).

The kind of proton dissociative group to be introduced in the above-described base body of the proton conductor is not limited to the above-described hydroxyl group but may be a group expressed by —XH, more preferably, —YOH, wherein each of X and Y is an arbitrary atom or an atomic group having bivalent bonds, and H and O designate a hydrogen atom and an oxygen atom, respectively. Specifically, in addition to the above-described —OH group, either of a hydrogen sulfate group (—$OSO_3H$), a carboxyl group (—COOH), a sulfone group (—$SO_3H$), and a phosphate group (—$OPO(OH)_2$) is preferably used as the proton dissociative group to be introduced in the base body of the proton conductor.

Even in the case of using any of the above-described proton conductors, the conduction of protons does not require the aid of a humidifier, and therefore, it is possible to obtain the same effect as that of the first or second embodiment.

What is claimed is:

1. A fuel cell comprising:
   a) a first electrode having a catalyst for generating hydrogen;
   b) a storage material comprising a hydrogen storing alloy effective for capturing and storing the hydrogen generated at said first electrode;
   c) a separation membrane between said storage material and said first electrode that essentially prevents said storage material from being corroded;
   d) a second electrode having a catalyst for generating oxygen, said second electrode being provided while allowed to be in contact with water, and
   e) a proton conductive electrolyte membrane having a proton conductor produced by introducing proton dissociative groups into a base body comprising a carbonaceous material containing carbon as a main component, said electrolyte membrane being provided between said first electrode and second electrode, wherein,
   when a negative voltage is applied to said first electrode and a positive voltage is applied to said second electrode, oxygen, protons and electrons are generated from water in the presence of said catalyst at said second electrode, and hydrogen is generated from the protons and the electrons in the presence of said catalyst at said first electrode.

2. A fuel cell according to claim 1, wherein
   said first electrode functions, in a state that no voltage is applied to said first electrode, as a fuel electrode which comes in contact with the hydrogen stored in said storage material, to generate protons and electrons from the hydrogen in the presence of said catalyst at said first electrode;
   said electrolyte membrane functions, in a state that no voltage is applied to each of said first electrode and second electrode, as an ion exchange membrane which conducts the protons generated at said first electrode to said second electrode; and,
   said second electrode functions, in a state that no voltage is applied to said second electrode, as an oxygen electrode which comes in contact with oxygen, to generate water from the oxygen, the electrons, and the protons in the presence of said catalyst at said second electrode;
   whereby said fuel cell releases electric power as a whole, to thus perform power generation.

3. A fuel cell according to claim 1, wherein said storage material comprising from fullerene molecules, carbon nanotubes, or carbon nanofibers.

4. A fuel cell comprising:
   a) a first electrode having a catalyst for generating hydrogen;
   b) a storage material comprising a hydrogen storing alloy effective for capturing and storing the hydrogen generated at said first electrode;
   c) a separation membrane between said storage material and said first electrode that essentially prevents said storage material from being corroded, said separation membrane being selectively permeable to hydrogen;
   d) a second electrode having a catalyst for generating oxygen, said second electrode being provided while allowed to be in contact with water; and
   e) a proton conductive electrolyte membrane having a proton conductor produced by introducing proton dissociative groups into a base body comprising a carbonaceous material containing carbon as a main component, said electrolyte membrane being provided between said first electrode and second electrode,
   wherein,
   when a negative voltage is applied to said first electrode and a positive voltage is applied to said second electrode, oxygen, protons and electrons are generated from water in the presence of said catalyst at said second electrode, and hydrogen is generated from the protons and the electrons in the presence of said catalyst at said first electrode.

5. A fuel cell comprising:
   a) a first electrode having a catalyst for generating hydrogen;
   b) a storage material comprising a hydrogen storing alloy effective for capturing and storing the hydrogen generated at said first electrode;
   c) a separation membrane between said storage material and said first electrode that essentially prevents said storage material from being corroded, said separation membrane comprising polyethylene, polypropylene, or polytetrafluoroethylene;
   d) a second electrode having a catalyst for generating oxygen, said second electrode being provided while allowed to be in contact with water; and
   e) a proton conductive electrolyte membrane having a proton conductor produced by introducing proton dissociative groups into a base body comprising a carbonaceous material containing carbon as a main component, said electrolyte membrane being provided between said first electrode and second electrode;
   wherein,
   when a negative voltage is applied to said first electrode and a positive voltage is applied to said second electrode, oxygen, protons and electrons are generated from water in the presence of said catalyst at said second electrode, and hydrogen is generated from the protons and the electrons in the presence of said catalyst at said first electrode.

6. A fuel cell comprising:

a) a first electrode having a catalyst for generating hydrogen;

b) a storage material for capturing and storing the hydrogen generated at said first electrode;

c) a storage body where said storage material being in the form of fine particles are aggregated, said storage body is disposed in proximity to said first electrode or directly connected to said first electrode, d) a separation membrane between said storage material and said first electrode, that essentially prevents said fine particles of said storage material from being scattered to said first electrode;

e) a second electrode having a catalyst for generating oxygen, said second electrode being provided while allowed to be in contact with water; and f) a proton conductive electrolyte membrane having a proton conductor produced by introducing proton dissociative groups into a base body comprising a carbonaceous material containing carbon as a main component, said electrolyte membrane being provided between said first electrode and second electrode, wherein, when a negative voltage is applied to said first electrode and a positive voltage is applied to said second electrode, oxygen, protons and electrons are generated from water in the presence of said catalyst at said second electrode, and hydrogen is generated from the protons and the electrons in the presence of said catalyst at said first electrode.

7. A fuel comprising:

a) a first electrode having a catalyst for generating hydrogen;

b) a storage material for capturing and storing the hydrogen generated at said first electrode;

c) a storage body where said storage material being in the form of fine particles are aggregated, said storage body is disposed in proximity to said first electrode or directly connected to said first electrode, d) a separation membrane between said storage material and said first electrode that essentially prevents said fine particles of said storage material from being scattered to said first electrode, said separation membrane being selectively permeable to hydrogen;

e) a second electrode having a catalyst for generating oxygen, said second electrode being provided while allowed to be in contact with water; and f) a proton conductive electrolyte membrane having a proton conductor produced by introducing proton dissociative groups into a base body comprising a carbonaceous material containing carbon as a main component, said electrolyte membrane being provided between said first electrode and second electrode;

wherein, when a negative voltage is applied to said first electrode and a positive voltage is applied to said second electrode, oxygen, protons and electrons are generated from water in the presence of said catalyst at said second electrode, and hydrogen is generated from the protons and the electrons in the presence of said catalyst at said first electrode.

8. A fuel cell comprising:

a) a first electrode having a catalyst for generating hydrogen;

b) a storage material for capturing and storing the hydrogen generated at said first electrode;

c) a storage body wherein said storage material in the form of fine particles are aggregated, said storage body is disposed in proximity to said first electrode or directly connected to said first electrode, d) a separation membrane between said storage material and said first electrode that essentially prevents said fine particles of said storage material from being scattered to said first electrode, said separation membrane comprising polyethylene, polypropylene, or polytetrafluoroethylene.

b) a second electrode having a catalyst for generating oxygen, said second electrode being provided while allowed to be in contact with water; and c) a proton conductive electrolyte membrane having a proton conductor produced by introducing proton dissociative groups into a base body comprising a carbonaceous material containing carbon as a main component, said electrolyte membrane being provided between said first electrode and second electrode, wherein, when a negative voltage is applied to said first electrode and a positive voltage is applied to said second electrode, oxygen, protons and electrons are generated from water in the presence of said catalyst at said second electrode, and hydrogen is generated from the protons and the electrons in the presence of said catalyst at said first electrode.

* * * * *